United States Patent
Magalotti et al.

(10) Patent No.: US 11,062,487 B2
(45) Date of Patent: Jul. 13, 2021

(54) SYSTEM AND METHOD FOR IMAGE RECONSTRUCTION

(71) Applicant: SHANGHAI UNITED IMAGING HEALTHCARE CO., LTD., Shanghai (CN)

(72) Inventors: Mark Magalotti, Houston, TX (US); Patrick Kling, Houston, TX (US)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 0 days.

(21) Appl. No.: 16/686,581

(22) Filed: Nov. 18, 2019

(65) Prior Publication Data
US 2020/0082580 A1   Mar. 12, 2020

Related U.S. Application Data

(63) Continuation of application No. 15/499,923, filed on Apr. 28, 2017, now Pat. No. 10,482,632.

(51) Int. Cl.
G06T 11/00 (2006.01)
G06T 1/20 (2006.01)
G06T 1/60 (2006.01)

(52) U.S. Cl.
CPC ............. G06T 11/005 (2013.01); G06T 1/20 (2013.01); G06T 1/60 (2013.01); G06T 11/006 (2013.01);
(Continued)

(58) Field of Classification Search
CPC ....... G06T 11/005; G06T 11/006; G06T 1/20; G06T 1/60; G06T 2211/428;
(Continued)

(56) References Cited

U.S. PATENT DOCUMENTS

| | | | | |
|---|---|---|---|---|
| 2002/0154727 A1* | 10/2002 | Ning | .................... | A61B 6/032 378/4 |
| 2003/0169842 A1* | 9/2003 | Nishide | ................... | A61B 6/08 378/4 |

(Continued)

FOREIGN PATENT DOCUMENTS

| | | |
|---|---|---|
| CN | 101908321 A | 12/2010 |
| CN | 103211608 A | 7/2013 |

(Continued)

OTHER PUBLICATIONS

Extended European Search Report in European Application No. 17178747.6 dated Feb. 22, 2018, 7 pages.

(Continued)

*Primary Examiner* — Jacinta M Crawford
*Assistant Examiner* — Kim Thanh T Tran
(74) *Attorney, Agent, or Firm* — Metis IP LLC

(57) ABSTRACT

The disclosure relates to a system and method for determining and pre-fetching projection data in image reconstruction. The method may include: determining a sequence of a plurality of pixels including a first pixel and a second pixel relating to the first pixel; determining a first geometry calculation used for at least one processor to access a first set of projection data relating to the first pixel from a first storage; determining a second geometry calculation based on the first geometry calculation; determining a first data template relating to the first pixel and a second data template relating to the second pixel based on the second geometry calculation; and pre-fetching a second set of projection data based on the first data template and the second data template, from a storage.

18 Claims, 13 Drawing Sheets

(52) U.S. Cl.
CPC ..... *G06T 2210/41* (2013.01); *G06T 2211/416* (2013.01); *G06T 2211/421* (2013.01); *G06T 2211/424* (2013.01); *G06T 2211/428* (2013.01)

(58) Field of Classification Search
CPC ........... G06T 2210/41; G06T 2211/421; G06T 2211/424; G06T 2211/416
USPC ........................................................ 345/505
See application file for complete search history.

(56) References Cited

U.S. PATENT DOCUMENTS

| | | | | |
|---|---|---|---|---|
| 2008/0018919 | A1* | 1/2008 | Ohkawa | G06T 7/13 358/1.9 |
| 2010/0174871 | A1* | 7/2010 | Uchida | G06F 12/0804 711/143 |
| 2012/0066677 | A1* | 3/2012 | Tang | G06F 9/4856 718/1 |
| 2014/0143000 | A1 | 5/2014 | Kay | |
| 2016/0058404 | A1* | 3/2016 | Nitta | A61B 6/4241 378/5 |
| 2016/0334520 | A1 | 11/2016 | Flohr et al. | |

FOREIGN PATENT DOCUMENTS

| | | |
|---|---|---|
| CN | 103247075 A | 8/2013 |
| CN | 102567944 B | 10/2013 |
| CN | 104915992 A | 9/2015 |
| CN | 105608717 A | 5/2016 |
| CN | 106570886 A | 4/2017 |

OTHER PUBLICATIONS

Xiao Wang et al., High Performance Model Based image Reconstruction, ACM SIGPLAN NOTICES, 51(8): 1-12, 2016.
Fontaine E et al., Optimizing Katsevich Image Reconstructi Algorithm on Multicore Processors, 2007 International Conference on Parallel and Distibuted Systems, pp. 1-8, 2007.

* cited by examiner

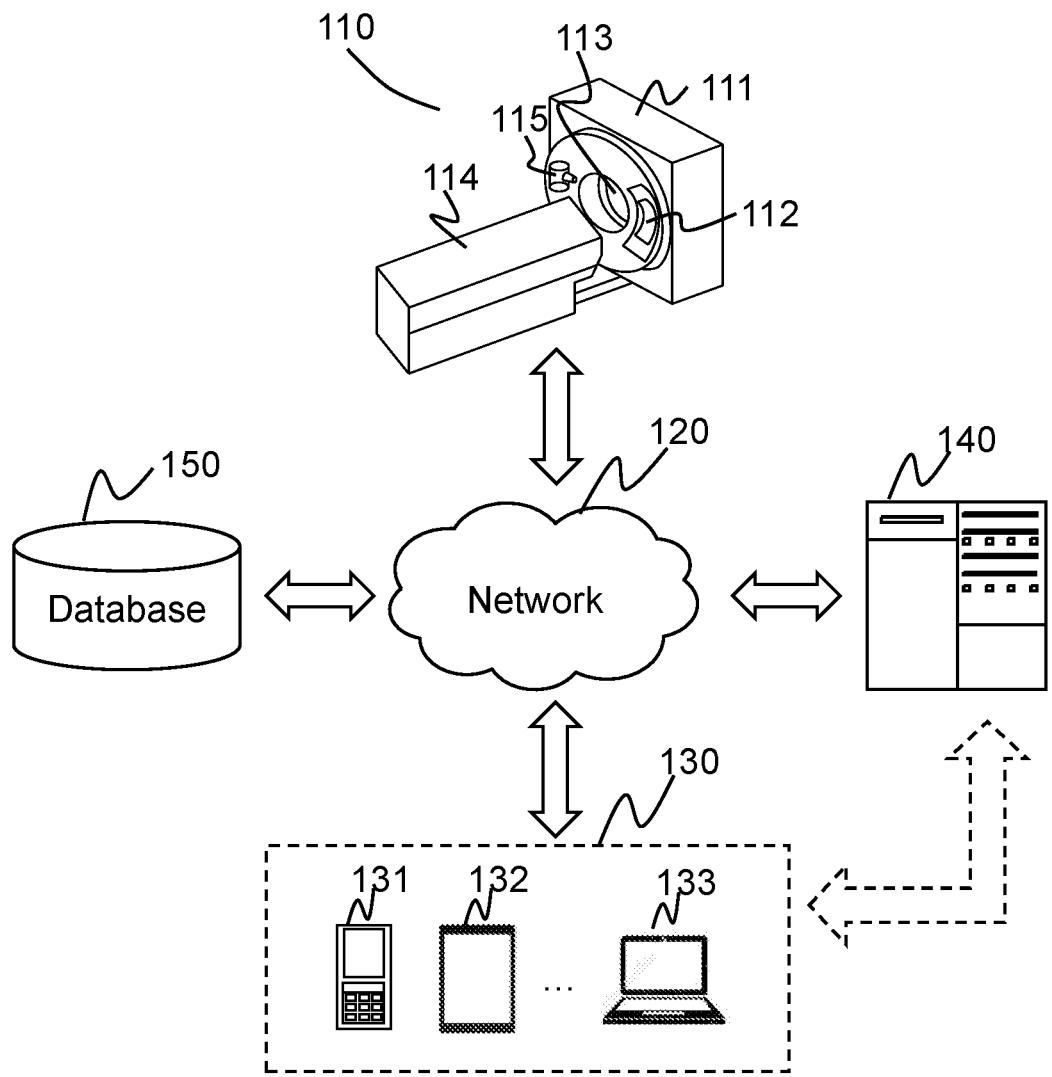
FIG. 1-A

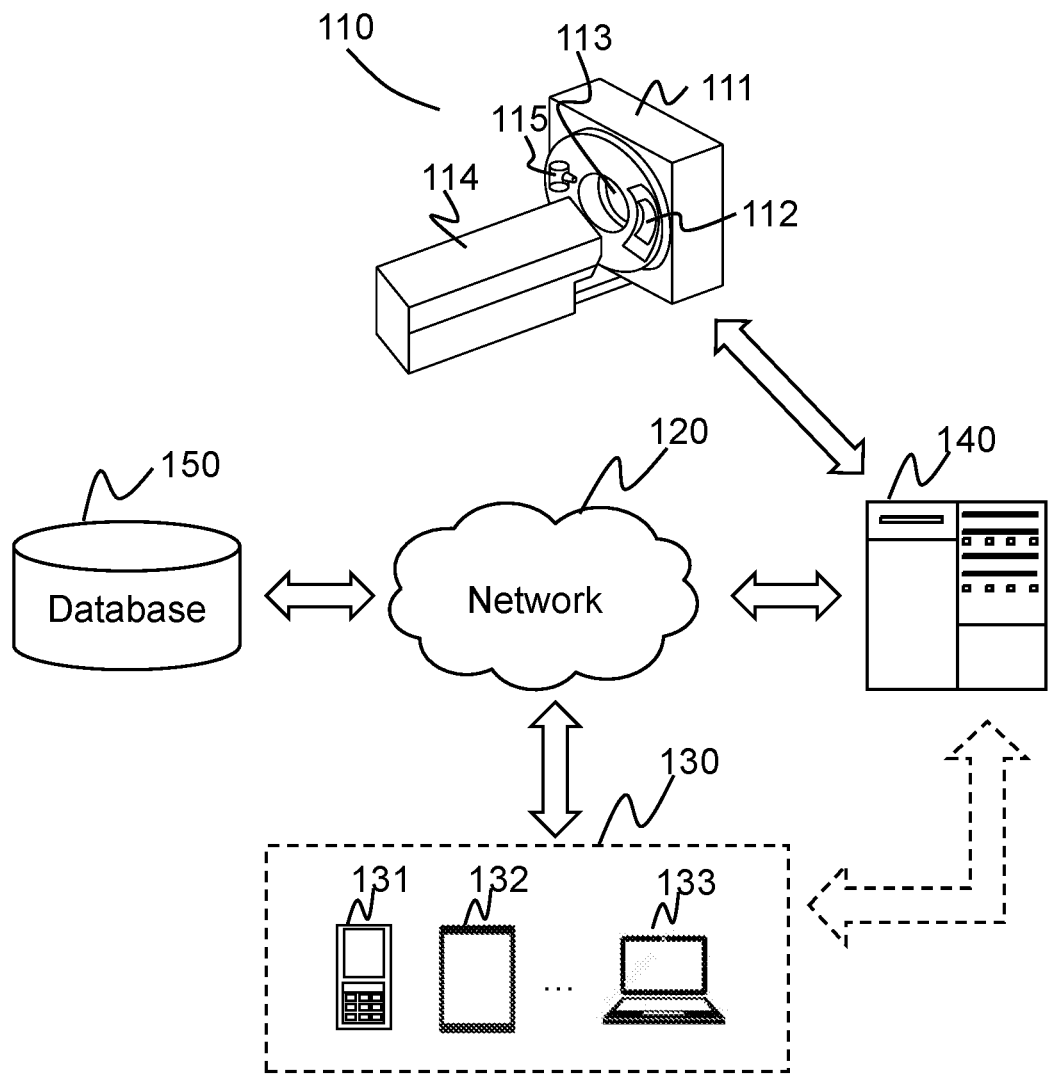
FIG. 1-B

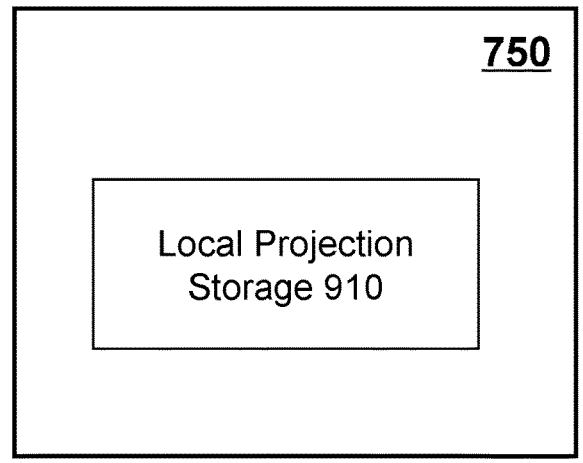
FIG. 9-A
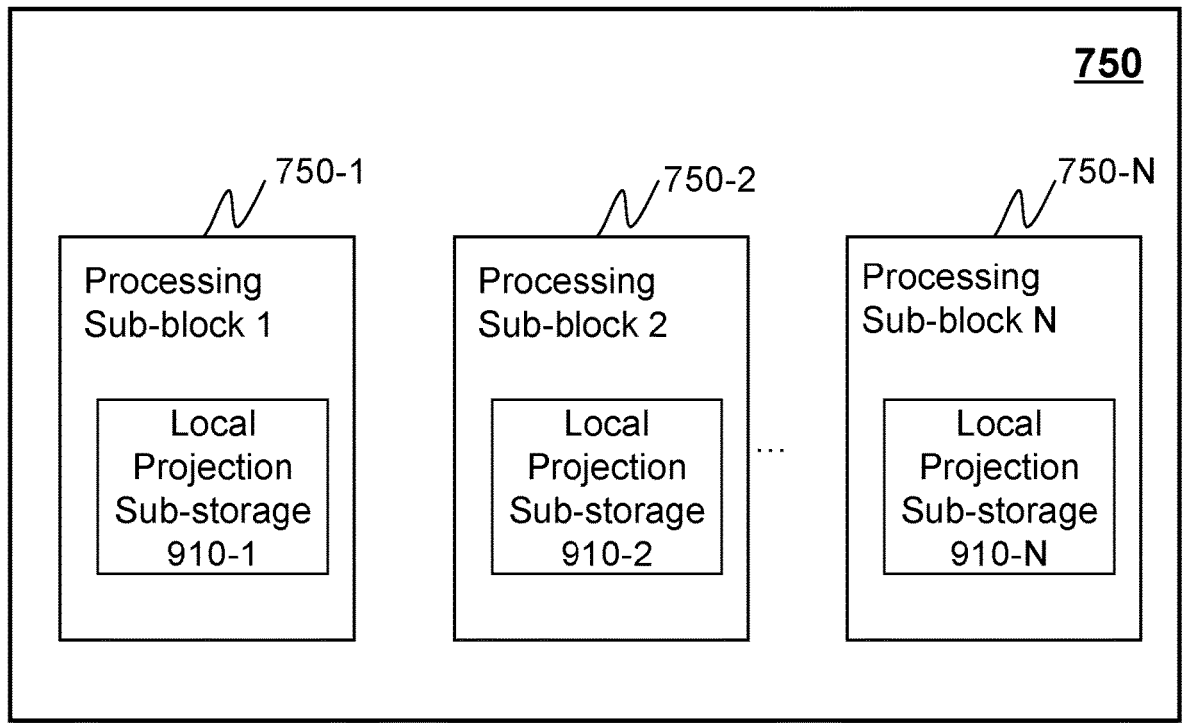
FIG. 9-B

SYSTEM AND METHOD FOR IMAGE RECONSTRUCTION

CROSS-REFERENCE TO RELATED APPLICATIONS

This application is a continuation of U.S. application Ser. No. 15/499,923 filed on Apr. 28, 2017, the contents of which are hereby incorporated by reference.

TECHNICAL FIELD

The present disclosure generally relates to image reconstruction, and more specifically relates to methods and systems for reconstructing a Computed Tomography (CT) image.

BACKGROUND

Imaging methods including Computed Tomography (CT), Positron Emission Tomography (PET), Single Photon Emission Computed Tomography (SPECT), and Magnetic Resonance Imaging (MRI) have been widely used in medical diagnosis. For example, CT is a technology that makes use of computer-processed combinations of X-ray images taken from different angles to produce cross-sectional images (i.e., CT images). The CT images may be generated based on a reconstruction algorithm. During the reconstruction process, projection data may be loaded from a storage and further processed by a processor, therefore, data bandwidth may be a limitation to the efficiency of the reconstruction process. There is a need for a system and method to load the projection data efficiently.

SUMMARY

In a first aspect of the present disclosure, a method for determining and pre-fetching projection data from a storage is provided. The method may include one or more of the following operations. A sequence of a plurality of pixels including a first pixel and a second pixel relating to the first pixel may be determined. A first geometry calculation used for at least one processor to access a first set of projection data relating to the first pixel from a first storage may be determined. A second geometry calculation may be determined based on the first geometry calculation. A first data template relating to the first pixel and a second data template relating to the second pixel may be determined based on the second geometry calculation. A second set of projection data may be pre-fetched by the first storage based on the first data template and the second data template, from a second storage.

In some embodiments, the first set of projection data may be accessed by the at least one processor from the first storage.

In some embodiments, the second set of projection data may be accessed by the at least one processor from the first storage.

In some embodiments, an image may be generated by the at least one processor based on the first set of projection data and the second set of projection data.

In some embodiments, the pre-fetching the second set of projection data may include one or more of the following operations. The first set of projection data may be filled into the first data template. An overlapping region where the second data template overlaps with the filled first data template may be determined. The second set of projection data may be pre-fetched based on the second data template less the overlapping region.

In some embodiments, the second set of projection data may be filled into the second data template by the first storage.

In some embodiments, the second geometry calculation may be the same as the first geometry calculation.

In some embodiments, the at least one processor comprises a plurality of processors.

In some embodiments, the plurality of processors may be arranged in a parallel architecture.

In some embodiments, the first storage may comprise a cache.

In some embodiments, the second pixel may be next to the first pixel in the sequence of the plurality of pixels.

In a second aspect of the present disclosure, a system for determining and pre-fetching projection data from a storage is provided. The system may include at least one storage medium including a set of instructions for fetching projection data and at least one processor configured to communicate with the at least one storage medium. When the at least one processor executing the set of instructions, the at least one processor is directed to perform one or more of the following operations. The at least one processor may determine a sequence of a plurality of pixels including a first pixel and a second pixel relating to the first pixel. The at least one processor may determine a first geometry calculation used for the at least one processor to access a first set of projection data relating to the first pixel from a first storage. The at least one processor may determine a second geometry calculation based on the first geometry calculation. The at least one processor may determine a first data template relating to the first pixel and a second data template relating to the second pixel based on the second geometry calculation. The at least one processor may pre-fetch a second set of projection data based on the first data template and the second data template, from a second storage.

In some embodiments, the at least one processor may be further directed to access the first set of projection data from the first storage.

In some embodiments, the at least one processor may be further directed to access the second set of projection data from the first storage.

In some embodiments, the at least one processor may be further directed to fill the first set of projection data into the first data template, determine an overlapping region where the second data template overlaps with the filled first data template, and pre-fetch the second set of projection data based on the second data template less the overlapping region.

In some embodiments, the second geometry calculation may be the same as the first geometry calculation.

In some embodiments, the at least one processor may comprise a plurality of processors.

In some embodiments, the plurality of processors are arranged in a parallel architecture.

In some embodiments, the second pixel is next to the first pixel in the sequence of the plurality of pixels.

In a third aspect of the present disclosure, a non-transitory computer readable medium is provided. The non-transitory computer readable medium may include executable instructions. When at least one processor executing the instructions, the at least one processor may effectuate a method including one or more of the following operations. A sequence of a plurality of pixels including a first pixel and a second pixel relating to the first pixel may be determined.

A first geometry calculation used for at least one processor to access a first set of projection data relating to the first pixel from a first storage may be determined. A second geometry calculation may be determined based on the first geometry calculation. A first data template relating to the first pixel and a second data template relating to the second pixel may be determined based on the second geometry calculation. A second set of projection data may be pre-fetched by the first storage based on the first data template and the second data template, from a second storage.

In some embodiments, the first storage may store projection data to be transmitted to the processor. The second storage may store projection data to be transmitted to the first storage.

In some embodiments, the first geometry calculation and/or the second geometry calculation may be used to determine projection data corresponding to a specific pixel or a specific image section.

In some embodiments, the second geometry calculation may be the same as the first geometry calculation.

In some embodiments, the first data template may include a frame that is partially filled or to be filled with projection data corresponding to the first pixel. The second data template may include a frame that is partially filled or to be filled with projection data corresponding to the second pixel.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1-A and FIG. 1-B are schematic diagrams illustrating an exemplary CT system according to some embodiments of the present disclosure;

FIG. 9-A and FIG. 9-B are schematic diagrams illustrating an exemplary processing block according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
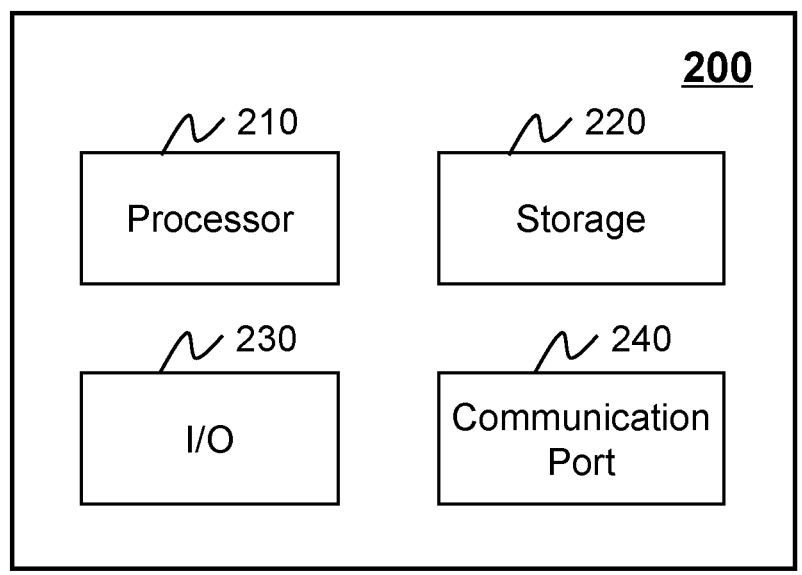
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for non-invasive imaging, such as for disease diagnosis or research purposes. In some embodiments, the imaging system may be a computed tomography (CT) system, an emission computed tomography (ECT) system, a magnetic resonance imaging (MRI) system, an ultrasonography system, an X-ray photography system, a positron emission tomography (PET) system, or the like, or any combination thereof.

For illustration purposes, the disclosure describes systems and methods for CT image reconstruction. The systems and methods may reconstruct a CT image based on an image reconstruction algorithm. During the reconstruction of the CT image, the systems and methods may divide corresponding projection data into a plurality portions of projection data. The plurality portions of projection data may correspond to a plurality of pixels. The systems and methods may fetch a portion of projection data corresponding to a specific pixel according to a pixel sequence.

The following description is provided to help better understanding CT image reconstruction methods and/or systems. The term "image" used in this disclosure may refer to a 2D image, a 3D image, a 4D image, and/or any related image data (e.g., CT data, projection data corresponding to the CT data). It should be noted that in this disclosure, the terms "image data" and "image" may be used interchangeably. This is not intended to limit the scope the present disclosure. For persons having ordinary skills in the art, a certain amount of variations, changes, and/or modifications may be deducted under the guidance of the present disclosure. Those variations, changes, and/or modifications do not depart from the scope of the present disclosure.

FIGS. 1-A and 1-B are schematic diagrams illustrating an exemplary CT system 100 according to some embodiments of the present disclosure. As shown, the CT system 100 may include a CT scanner 110, a network 120, one or more terminals 130, a processing engine 140, and a database 150.

The CT scanner 110 may include a gantry 111, a detector 112, a detecting region 113, a table 114, and a radioactive scanning source 115. The gantry 111 may support the detector 112 and the radioactive scanning source 115. A subject may be placed on the table 114 for scanning. The radioactive scanning source 115 may emit radioactive rays to the subject. The detector 112 may detect radiation events (e.g., gamma photons) emitted from the detecting region 113. In some embodiments, the detector 112 may include one or more detector units. The detector units may include a scintillation detector (e.g., a cesium iodide detector), a gas detector, etc. The detector unit may be and/or include a single-row detector and/or a multi-rows detector.

The network 120 may include any suitable network that can facilitate exchange of information and/or data for the CT system 100. In some embodiments, one or more components of the CT system 100 (e.g., the CT scanner 110, the terminal 130, the processing engine 140, the database 150, etc.) may communicate information and/or data with one or more other components of the CT system 100 via the network 120. For example, the processing engine 140 may obtain image data from the CT scanner 110 via the network 120. As another example, the processing engine 140 may obtain user instructions from the terminal 130 via the network 120. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, witches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the CT system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing engine 140.

The processing engine 140 may process data and/or information obtained from the CT scanner 110, the terminal 130, and/or the database 150. For example, the processing engine 140 may process projection data to generate an image. In some embodiments, the processing engine 140 may be a single server or a server group. The server group may be centralized or distributed. In some embodiments, the processing engine 140 may be local or remote. For example, the processing engine 140 may access information and/or data stored in the CT scanner 110, the terminal 130, and/or the database 150 via the network 120. As another example, the processing engine 140 may be directly connected to the CT scanner 110, the terminal 130 and/or the database 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented by a computing device 200 having one or more components as illustrated in FIG. 2.

The database 150 may store data, instructions, and/or any other information. In some embodiments, the database 150 may store data obtained from the terminal 130 and/or the processing engine 140. In some embodiments, the database 150 may store data and/or instructions that the processing engine 140 may execute or use to perform exemplary methods described in the present disclosure. In some embodiments, the database 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more other components in the CT system 100 (e.g., the processing engine 140, the terminal 130, etc.). One or more components in the CT system 100 may access the data or instructions stored in the database 150 via the network 120. In some embodiments, the database 150 may be directly connected to or communicate with one or more other components in the CT system 100 (e.g., the processing engine 140, the terminal 130, etc.). In some embodiments, the database 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 140 in accordance with techniques described herein. The computer instructions may include, for example, routines, programs, objects, components, data structures, procedures, modules, and functions, which perform particular functions described herein. For example, the processor 210 may process image data obtained from the CT scanner 110, the terminal 130, the database 150, and/or any other component of the CT system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the CT scanner 110, the terminal 130, the database 150, and/or any other component of the CT system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 140 for processing projection data or image data.

The I/O 230 may input and/or output signals, data, information, etc. In some embodiments, the I/O 230 may enable a user interaction with the processing engine 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 140 and the CT scanner 110, the terminal 130, and/or the database 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
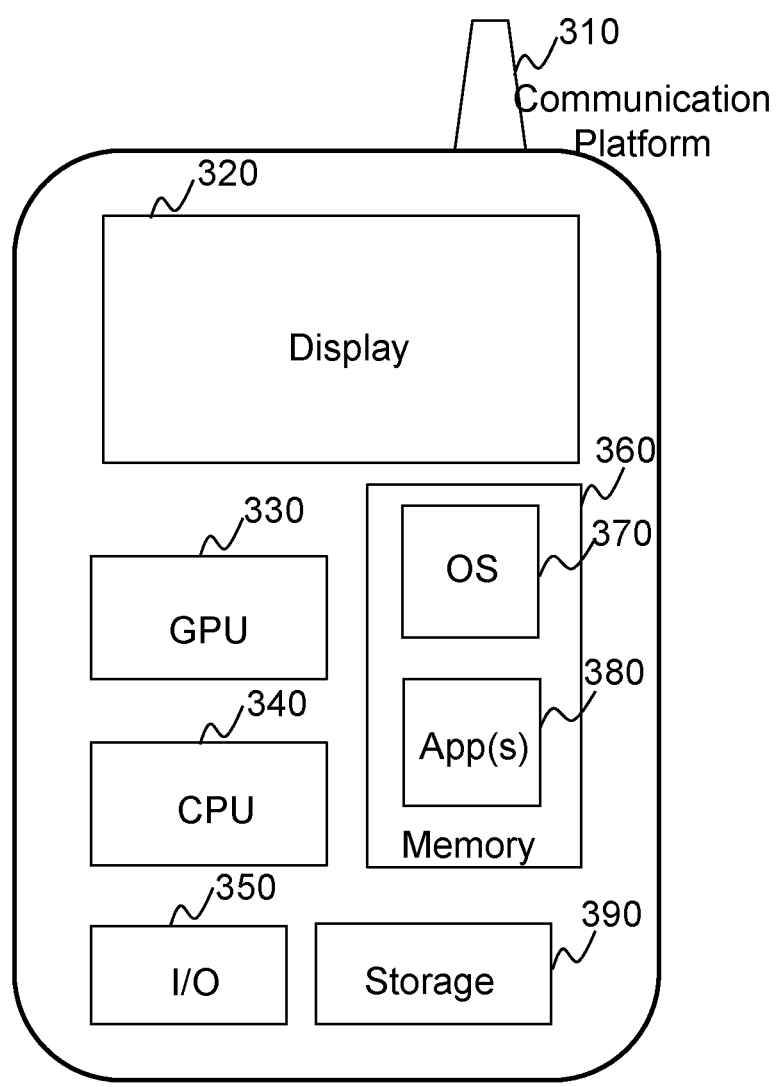
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the CT system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
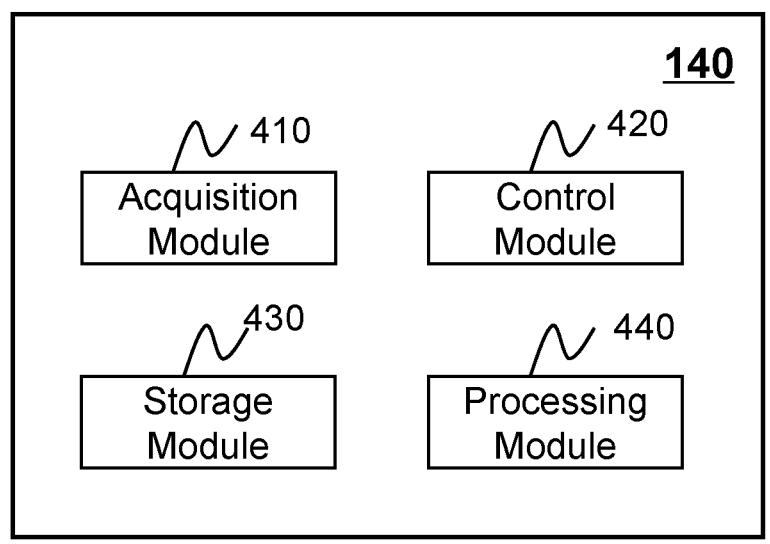
FIG. 4 is a block diagram illustrating an exemplary processing engine according to some embodiments of the present disclosure.

FIG. 4 is a block diagram illustrating an exemplary processing engine 140 according to some embodiments of the present disclosure. The processing engine 140 may include an acquisition module 410, a control module 420, a storage module 430, and a processing module 440.

The acquisition module 410 may acquire CT data. The acquisition module 410 may acquire the CT data from the detector 112. The CT data may be associated with X-rays that pass through a subject. In some embodiments, the radioactive scanning source 115 may emit the X-rays to the subject. The X-rays may pass through the subject and may attenuate during the passing process. The attenuated X-rays may be detected by the detector 112 and transmitted to the acquisition module 410. In some embodiments, the acquired CT data may be transmitted to the storage module 430 to be stored.

The control module 420 may control operations of the acquisition module 410, the storage module 430, and/or the processing module 440 (e.g., by generating one or more control parameters). For example, the control module 420 may control the acquisition module 410 to acquire a signal, the timing of the acquisition of the signal, etc. As another example, the control module 420 may control the processing module 440 to process the CT data acquired by the acquisition module 410. In some embodiments, the control module 420 may receive a real-time command or retrieve a predetermined command provided by a user (e.g., a doctor) to control one or more operations of the acquisition module 410 and/or the processing module 440. For example, the control module 420 can adjust the acquisition module 410 and/or the processing module 440 to generate images of a subject according to the real-time command and/or the predetermined command. In some embodiments, the control module 420 may communicate with one or more other modules of the processing engine 140 for exchanging information and/or data.

The storage module 430 may store CT data, control parameters, processed CT data, or the like, or a combination thereof. In some embodiments, the storage 430 may store one or more programs and/or instructions that may be executed by the processor(s) of the processing engine 140 to perform exemplary methods described in this disclosure. For example, the storage 430 may store program(s) and/or instruction(s) that can be executed by the processor(s) of the processing engine 140 to acquire CT data, reconstruct a CT image based on the CT data, and/or display any intermediate result or a resultant image. In some embodiments, the storage module 430 may include a mass storage. For example, the mass storage may include a magnetic disk, an optical disk, a solid-state drives, etc.

The processing module 440 may process information provided by various modules of the processing engine 140.

The processing module 440 may process CT data acquired by the acquisition module 410, CT data retrieved from the storage module 430, etc. In some embodiments, the processing module 440 may reconstruct CT images based on the CT data according to a reconstruction algorithm, generate reports including one or more CT images and/or other related information, and/or perform any other function for image reconstruction in accordance with various embodiments of the present disclosure. The reconstruction algorithm may include an iterative reconstruction algorithm (e.g., a statistical reconstruction algorithm), a Fourier slice theorem algorithm, a filtered back projection (FBP) algorithm, a fan-beam reconstruction algorithm, an analytic reconstruction algorithm, or the like, or any combination thereof.

In some embodiments, one or more modules illustrated in FIG. 4 may be implemented in at least part of the exemplary CT system as illustrated in FIGS. 1-A and 1-B. For example, the acquisition module 410, the control module 420, the storage module 430, and/or the processing module 440 may be integrated into a console (not shown). Via the console, a user may set parameters for scanning an object, controlling imaging processes, controlling parameters for reconstruction of an image, viewing reconstructed images, etc. In some embodiments, the console may be implemented via the processing engine 140 and/or the terminal 130.

Figure 5:
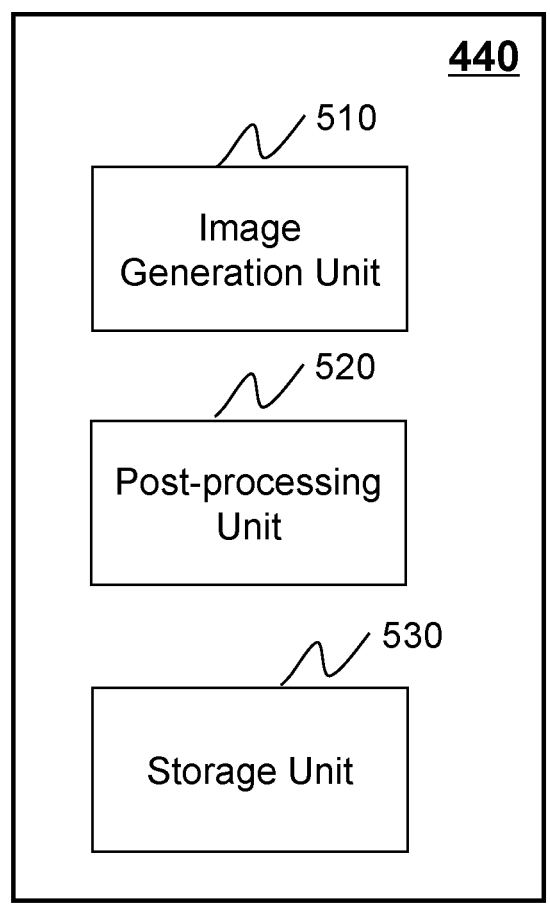
FIG. 5 is a block diagram illustrating an exemplary processing module according to some embodiments of the present disclosure.

FIG. 5 is a block diagram illustrating an exemplary processing module 440 according to some embodiments of the present disclosure. As illustrated in FIG. 5, the processing module 440 may include an image generation unit 510, a post-processing unit 520, and a storage unit 530.

The image generation unit 510 may generate image data (or an image) based on projection data. The image data may include 2D image data, 3D image data, or 4D image data. The image data may include CT image data, MRI image data, PET data, or the like, or any combination thereof. For example, the image data may be 3D CT image data. The image generation unit 510 may fetch the projection data from the storage module 430. In some embodiments, the image generation unit 510 may generate the image data based on a reconstruction algorithm. In some embodiments, the reconstruction algorithm may include a back projection algorithm and/or a forward projection algorithm. Merely by way of example, the reconstruction algorithm may include a Fourier slice theorem algorithm, a filtered back projection (FBP) algorithm, a fan-beam reconstruction algorithm, an iterative reconstruction algorithm, an analytic reconstruction algorithm, an algorithm based on compressed sensing (CS), or the like, or any combination thereof.

In some embodiments, the image generation unit 510 may generate a plurality portions of image data. In some embodiments, the image generation unit 510 may be implemented via a plurality of processors (e.g., the processor 210 illustrated in FIG. 2). The plurality of processors may be used to generate the plurality portions of image data.

In some embodiments, the image generation unit 510 may be connected to or communicate with the post-processing unit 520 and/or the storage unit 530. Merely by way of example, the image generation unit 510 may transmit the image data to the storage unit 530 to be stored. As another example, the image generation unit 510 may transmit the image data to the post-processing unit 520 to be further processed.

The post-processing unit 520 may post-process the image data. The post-processing unit 520 may obtain the image data from the image generation unit 510 and/or the storage unit 530. In some embodiments, the post-processing unit 520 may display the image data with a displayed effect (e.g., enlarging, twinkling, highlighting, etc.). In some embodiments, the post-processing unit 520 may reduce or remove artifact(s) or noise(s) in the image data. In some embodiments, the post-processing unit 520 may edit the image data. In some embodiments, the post-processing unit 520 may analyze image data and identify a tissue (e.g., a vessel) based on the analysis result.

The storage unit 530 may store the image data, the post-processed image data, or any information that may be used by the image generation unit 510 and/or the post-processing unit 520. In some embodiments, the storage format may include text, picture, audio, video, code, or the like, or a combination thereof. In some embodiments, one or more algorithms that may be used when, for example, the projection data is obtained, the image data is generated, the image data is post-processed, etc., may be stored in the storage unit 530. The storage unit 530 may be implemented via any storage device disclosed elsewhere in the present disclosure.

It should be noted that the above description of the processing module 440 is merely provided for the purposes of illustration, and not intended to limit the scope of the present disclosure. For persons having ordinary skills in the art, multiple variations and modifications may be made under the teaching of the present invention. However, those variations and modifications do not depart from the scope of the present disclosure. For example, the storage unit 530 may be omitted and the function of the storage unit 530 may be realized by the storage module 430.

Figure 6:
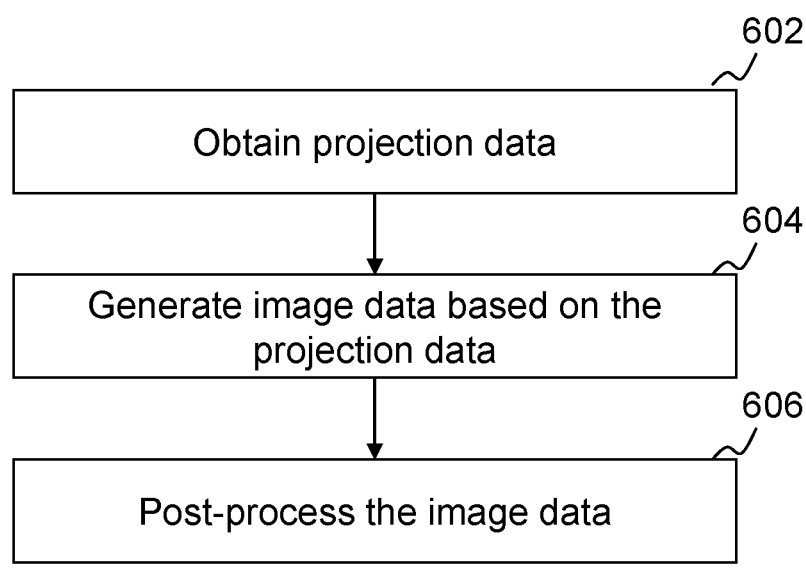
FIG. 6 is a flowchart illustrating an exemplary process for processing image data according to some embodiments of the present disclosure.

FIG. 6 is a flowchart illustrating an exemplary process 600 for processing image data according to some embodiments of the present disclosure.

In 602, projection data may be obtained. The projection data may be obtained by the image generation unit 510. The projection data may include sparse projection data, limited-range projection data, low-dose projection data, local projection data, incomplete projection data, or the like, or any combination thereof. In some embodiments, the projection data may be divided into a plurality portions of projection data based on a geometry calculation as illustrated below: {projection data 1, projection data 2, . . . , projection data i, . . . , and projection data N}.

In 604, image data may be generated based on the projection data. The image data may be generated by the image generation unit 510. In some embodiments, a plurality portions of image data may be generated based on the plurality portions of projection data respectively. For example, the plurality portions of image data may be expressed as below: {image data 1, image data 2, . . . , image data i, . . . , and image data N}.

In some embodiments, the plurality portions of image data may correspond to a plurality of pixels, for example, a first pixel, a second pixel, etc. In some embodiments, the plurality portions of image data may correspond to a plurality of image sections, for example, a first image section, a second image section, etc. As used herein, an image section may refer to a section including a certain number (e.g., 2) of pixels.

In 606, the image data may be post-processed. The image data may be post-processed by the post-processing unit 520. For example, part(s) of the image data may be highlighted. As another example, a contrast or a resolution ratio of the image data may be edited. As a further example, the image data may be filtered to reduce noise(s). As a still further example, a region of interest (ROI) may be determined in the image data and a tissue (e.g., a vessel) may be identified. In some embodiments, the post-processed image data may be transmitted to the storage unit 530, the storage module 430, or any storage disclosed elsewhere in the present disclosure. In some embodiments, the post-processed image data may be transmitted to the terminal 130 or the database 150.

It should be noted that the flowchart described above is provided for the purposes of illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, a step in which the projection data and/or the image data may be stored may be added to the process 600.

Figure 7:
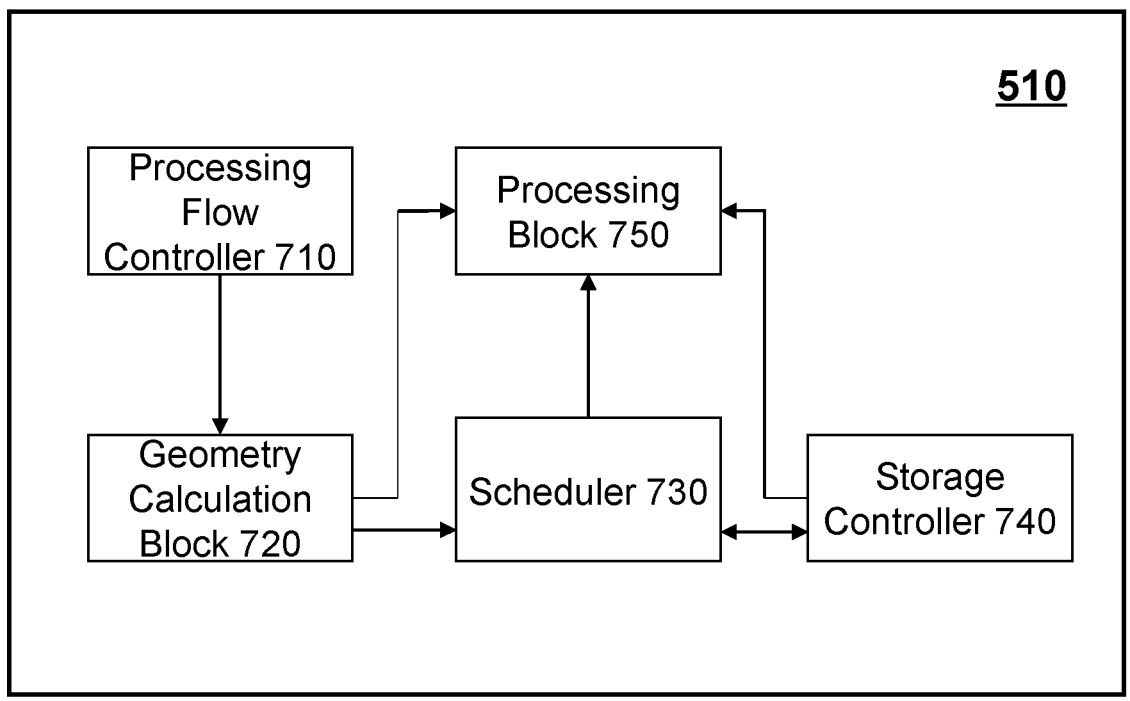
FIG. 7 is a schematic diagram illustrating an exemplary image generation unit according to some embodiments of the present disclosure.

FIG. 7 is a schematic diagram illustrating an exemplary image generation unit 510 according to some embodiments of the present disclosure. As illustrated in FIG. 7, the image generation unit 510 may include a processing flow controller 710, a geometry calculation block 720, a scheduler 730, a storage controller 740, and a processing block 750.

The processing flow controller 710 may determine a pixel sequence or an image section sequence. As used herein, the pixel sequence may refer to a sequence in which a plurality of pixels may be arranged. The image section sequence may refer to a sequence in which a plurality of image sections may be arranged. As described in connection with 602, the plurality portions of projection data may correspond to the plurality of pixels (or the plurality of image sections). The plurality portions of projection data may be processed based on the pixel sequence (or the image section sequence). In some embodiments, each of the plurality of pixels (or the plurality of image sections) may be assigned with a pixel tag (or section tag) to identify the pixel (or image section) in the pixel sequence (or image section sequence). The pixel tag (or section tag) may include a tag, a serial number, a code, or the like, or a combination thereof. In some embodiments, a portion of projection data corresponding to a specific pixel (or image section) may be associated with the corresponding pixel tag (or section tag) assigned to the specific pixel (or image section). The portion of projection data may be identified based on the pixel tag (or section tag).

In some embodiments, the processing flow controller 710 may be connected to or communicate with the geometry calculation block 720. For example, the processing flow controller 710 may transmit the pixel sequence (or image section sequence) to the geometry calculation block 720.

The geometry calculation block 720 may determine a geometry calculation. The geometry calculation may be used to determine projection data corresponding to a specific pixel or a specific image section. In some embodiments, the geometry calculation block 720 may determine a first geometry calculation and transmit the first geometry calculation to the processing block 750. The processing block 750 may access projection data from a first storage (not shown) (e.g., the scheduler 730 and/or the storage controller 740) based on the first geometry calculation. The first storage may pre-fetch the projection data from a second storage (not shown) (e.g., the storage module 430 and/or the storage controller 740). In some embodiments, the geometry calculation block 720 may determine a second geometry calculation and transmit the second geometry calculation to the scheduler 730. In some embodiments, the geometry calculation block 720 may determine the second geometry calculation based on the first geometry calculation. The first storage (e.g., the scheduler 730) may access projection data from the second storage based on the second geometry calculation.

In some embodiments, the geometry calculation block 720 may determine a data template based on the geometry calculation. The data template may include a frame that is partially filled or to be filled with projection data corresponding to a specific pixel (or image section). In some embodiments, a plurality of data templates may be determined. Each of the plurality of data templates may correspond to a pixel (or an image section). For example, the data template corresponding to a specific pixel (or a specific image section) may include a frame that is partially filled or to be filled with projection data needed to generate image data corresponding to the specific pixel (or the specific image section). In some embodiments, the data template may be generated based on the second geometry calculation. Merely by way of example, the projection data needed to generate image data corresponding to a specific pixel (or a specific image section) may be determined based on the second geometry calculation, and the data template relating to the specific pixel (or image section) may be generated based on the determined projection data.

The scheduler 730 may obtain information from the geometry calculation block 720, the storage controller 740, and/or the storage module 430, and send information to the storage controller 740 or the processing block 750. For example, the scheduler 730 may obtain the second geometry calculation from the geometry calculation block 720. As another example, the scheduler 730 may fetch projection data from the storage controller 740 or the storage module 430 based on second the geometry calculation, and send the fetched projection data to the processing block 750.

In some embodiments, the scheduler 730 may determine scheduling information. The scheduling information may relate to what projection data to fetch from the storage controller 740 or the storage module 430, when to fetch the projection data from the storage controller 740 or the storage module 430, and/or when to send the projection data to the processing block 750. In some embodiments, the scheduler 730 may determine what projection data to fetch from the storage controller 740 or the storage controller 740 based on the pixel sequence (or the image section sequence) and the second geometry calculation. For example, the scheduler 730 may select a specific pixel (e.g., the first pixel) according to the pixel sequence and determine projection data corresponding to the specific pixel. Further, the scheduler 730 may pre-fetch at least part of the projection data (as used herein, the projection data may be referred to as "projection data to be used") corresponding to the specific pixel from the storage controller 740 or the storage module 430. The scheduler 730 may determine the projection data to be used based on shadow information of the specific pixel. As used herein, shadow information of a pixel may refer to information relating to a shadow location of the pixel on a projection plane. In some embodiments, the shadow information of the pixel may be determined based on the second geometry calculation. In some embodiments, during or before the generation of image data corresponding to the specific pixel mentioned above, the scheduler 730 may select a next pixel (e.g., the second pixel) according to the pixel sequence and repeat the process above.

In some embodiments, the scheduler 730 may determine when to transmit the pre-fetched projection data to the processing block 750. Merely by way of example, the scheduler 730 may determine image data corresponding to a specific pixel (or a specific image section) being generated by the processing block 750, and when the processing block 750 has completed the generation of the image data corresponding to the specific pixel (or the specific image section)

(also referred to as "processing of the projection data corresponding to the specific pixel (or the specific image section)), the scheduler 730 may send the pre-fetched projection data corresponding to a next pixel according to the pixel sequence to the processing block 750.

The storage controller 740 may communicate with the scheduler 730, the processing block 750, and/or the storage module 430. For example, the storage controller 740 may fetch projection data from the storage module 430 based on the second geometry calculation. As another example, the storage controller 740 may transmit the projection data to the scheduler 730 and/or the processing block 750.

The processing block 750 may generate image data based on the projection data. The projection data may be fetched from the first storage. Merely by way of example, the projection data may be fetched from the scheduler 730 and/or the storage controller 740. The processing block 750 may generate the image data according to the pixel sequence or the image section sequence. For example, the processing block 750 may fetch projection data 1 corresponding to the first pixel (or the first image section) from the scheduler 730 or the storage controller 740 and generate the image data 1 based on the projection data 1. After the image data 1 is generated, the processing block 730 may further fetch projection data 2 corresponding to the second pixel (or the second image section) from the scheduler 730 or the storage controller 740 and generate image 2 based on the projection data 2.

It should be noted that the above description of the image generation unit 510 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the image generation unit 510 may include a plurality of sub-processing blocks. The scheduler 730 may include a plurality of sub-schedulers. The plurality of sub-schedulers may correspond to the plurality of sub-processing blocks respectively. As another example, the scheduler 730 may be configured to determine the data template based on the second geometry calculation rather than the geometry calculation block 720. Still, as another example, the scheduler 730 and the storage controller 740 may be integrated into an independent block used to implement more than one functions. As a further example, the storage controller 740 may be omitted.

Figure 8:
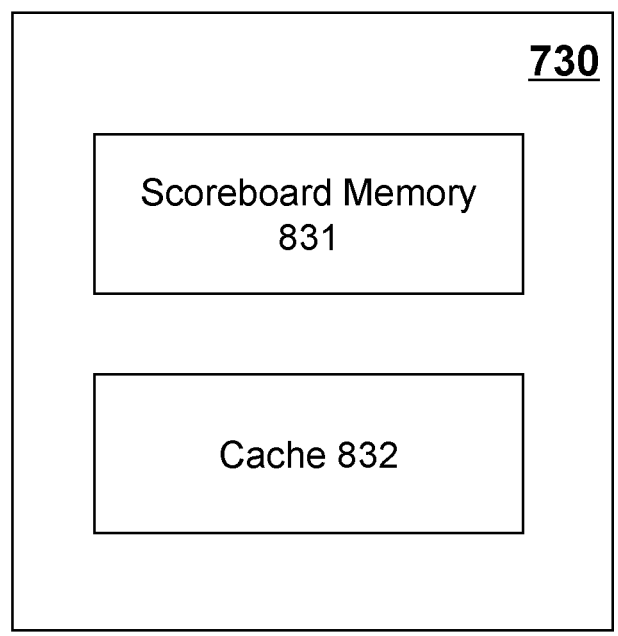
FIG. 8 is a schematic diagram illustrating an exemplary scheduler according to some embodiments of the present disclosure.

FIG. 8 is a schematic diagram illustrating an exemplary scheduler 730 according to some embodiments of the present disclosure. As illustrated in FIG. 8, the scheduler 730 may include a scoreboard memory 831 and a cache 832.

The scoreboard memory 831 may store a scoreboard configured to monitor what projection data is present in the processing block 750. In some embodiments, the scoreboard may be an algorithm used to determine whether and/or when to transmit projection data to the processing block 750. Merely by way of example, the projection data corresponding to a next pixel (or a next image section) according to the pixel sequence (or the image section sequence) may be transmitted to the processing block 750 only when the scoreboard memory 831 determines that the processing block 750 has completed the processing of projection data corresponding to a specific pixel (or a specific image section).

The cache 832 may store the projection data fetched by the scheduler 730. Merely by way of example, the cache 832 may store the projection data pre-fetched from the storage controller 740 and/or the storage module 430. In some embodiments, the cache 832 may include a first data port and a second data port. The first data port may be connected to the storage module 430 and the second data port may be connected to the processing block 750.

It should be noted that the above description of the scheduler 730 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the cache 832 may be located outside of the scheduler 730 (e.g., the storage controller 740).

FIG. 9-A and FIG. 9-B are schematic diagrams illustrating an exemplary processing block 750 according to some embodiments of the present disclosure.

As illustrated in FIG. 9-A, the processing block 750 may include a local projection storage 910. The local projection storage 910 may store the projection data received from the first storage (e.g., the scheduler 730 or the storage controller 740). In some embodiments, the projection data stored in the local projection storage 910 may include the projection data needed for generating a portion of image data corresponding to a specific pixel (or a specific image section) and at least part of the projection data needed for generating a portion of image data corresponding to a next pixel (or a next image section) according to the pixel sequence (or the image section sequence).

As illustrated in FIG. 9-B, the processing block 750 may include a plurality of processing sub-blocks including a first processing sub-block 750-1, a second processing sub-block 750-2, . . . , and an nth processing sub-block 750-N. The plurality of processing sub-blocks may be arranged in a parallel architecture. In some embodiments, the plurality of processing sub-blocks may process a plurality portions of projection data to generate a plurality portions of image data in parallel.

In some embodiments, each of the plurality of processing sub-blocks may include a local projection sub-storage. For example, the processing sub-block 750-1 may include a local projection sub-storage 910-1, the processing sub-block 750-2 may include a local projection sub-storage 910-2, etc. The local projection sub-storage may store the projection data to be processed by the processing sub-block in which the local projection sub-storage is located. For example, the local projection sub-storage 910-1 may store the projection data to be processed by the processing sub-block 750-1.

It should be noted that the above description of the processing block 750 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the plurality of processing sub-blocks may be partially interconnected with each other.

Figure 10:
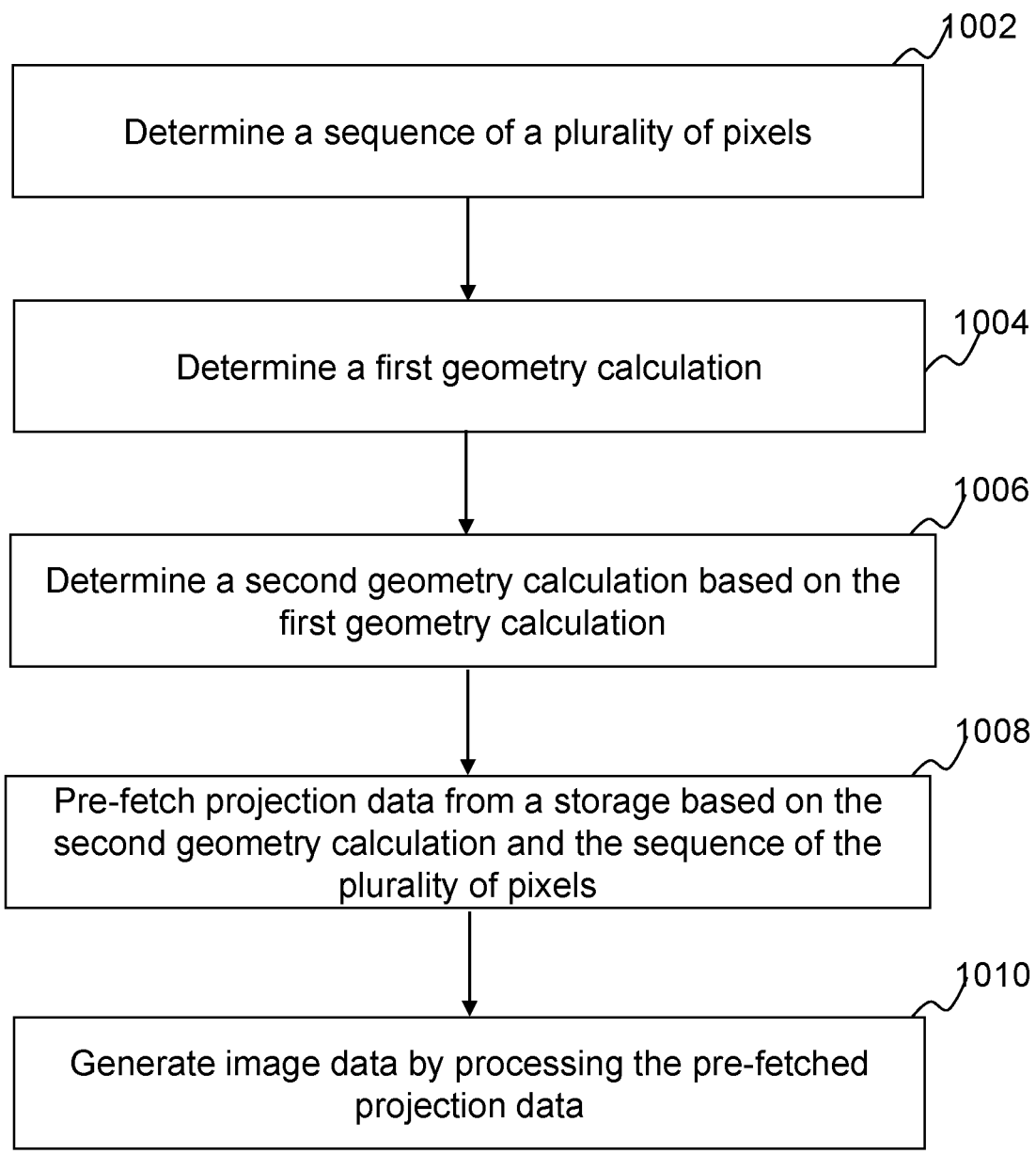
FIG. 10 is a flowchart illustrating an exemplary process for generating image data according to some embodiments of the present disclosure.

FIG. 10 is a flowchart illustrating an exemplary process 1000 for generating image data according to some embodiments of the present disclosure.

In 1002, a pixel sequence (also referred to as "a sequence of a plurality of pixels") may be determined. As used herein, the pixel sequence may refer to a sequence in which a plurality of pixels may be arranged. The pixel sequence may be determined by the processing flow controller 710. For example, the pixel sequence may be expressed as below: {a first pixel, a second pixel, . . . , an ith pixel, . . . , an nth pixel}.

In some embodiments, an image section sequence may be determined. As used herein, the image section sequence may refer to a sequence in which a plurality of image sections may be arranged. For example, the image section sequence may be expressed as below: {a first image section, a second image section, . . . , an ith image section, . . . , an nth image section}, as used herein, an image section may include a certain number (e.g., 2) of pixels.

In 1004, a first geometry calculation may be determined. The first geometry calculation may be determined by the geometry calculation block 720. As described in connection with the calculation block 720, the first geometry calculation may be used to access projection data from the first storage (e.g., the scheduler 730 and/or the storage controller 740) by the processing block 750.

In 1006, a second geometry calculation may be determined based on the first geometry calculation. The second geometry calculation may be determined by the geometry calculation block 720. The second geometry calculation may be the same as the first geometry calculation. As described in connection with the calculation block 720, the second geometry calculation may be used to access projection data from the second storage. For example, the second geometry calculation may be used to access projection data from the storage module 430 and/or the storage controller 740 by the scheduler 730 (or access projection data from the storage module 430 by the storage controller 740). In some embodiments, the first geometry calculation and the second geometry calculation may be collectively referred to as "geometry calculation". As used herein, the geometry calculation may be used to determine projection data of a specific pixel or a specific image section in a storage (e.g., the storage module 430, the cache 832, etc.).

In 1008, projection data may be pre-fetched from a storage (e.g., the second storage mentioned above) based on the second geometry calculation and the sequence of the plurality of pixels. The projection data may be pre-fetched by the scheduler 730 or the storage controller 740. For example, assuming that image data (e.g., the image data 1) corresponding to a specific pixel (e.g., the first pixel) is being generated, at least part of projection data (e.g., the projection data 2) corresponding to a next pixel (e.g., the second pixel) according to the pixel sequence may be pre-fetched. The pre-fetched projection data may be stored in the scheduler 730 (e.g., the cache 832) or the storage controller 740.

In 1010, image data may be generated by processing the pre-fetched projection data. For example, as described in connection with 1008, the image data 2 corresponding to the second pixel may be generated based on the projection data 2 pre-fetched by the scheduler 730 or the storage controller 740. In some embodiments, the image data may be generated based on the projection data according to a reconstruction algorithm disclosed elsewhere in the present disclosure. Merely by way of example, the image data may be generated based on filtered back award projection (FBP) algorithm.

It should be noted that the above description of the flowchart in FIG. 10 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the process 1000 illustrated in FIG. 10 may be performed by a plurality of processing sub-blocks (e.g., 750-1, 750-2, 750-N, etc.) in parallel.

Figure 11:
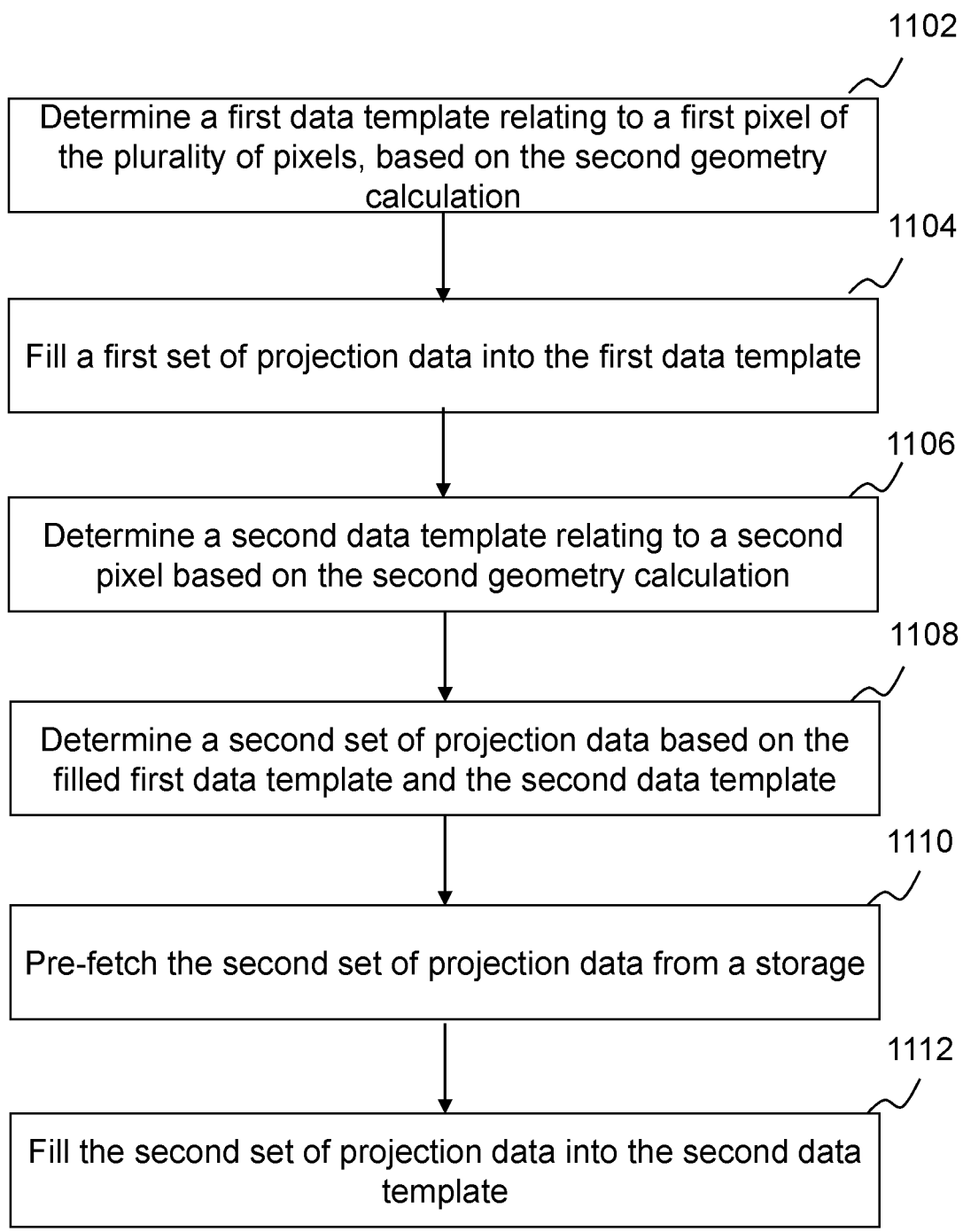
FIG. 11 is a flowchart illustrating an exemplary process for fetching projection data according to some embodiments of the present disclosure.

FIG. 11 is a flowchart illustrating an exemplary process 1100 for fetching projection data according to some embodiments of the present disclosure.

In 1102, a first data template (e.g., 1210 illustrated in FIG. 12) relating to a first pixel of the plurality of pixels may be determined based on the second geometry calculation. The first data template may be determined by the scheduler 730 or the geometry calculation block 720. The first data template may include a frame that is partially filled or to be filled with the projection data needed to generate the image data 1 corresponding to the first pixel. As described in connection with 1008, projection data (i.e., the projection data 1) needed to generate the image data 1 corresponding to the first pixel may be determined based on the second geometry calculation.

In 1104, a first set of projection data may be filled into the first data template. The first set of projection data may correspond to the first pixel. The first set of projection data may be filled into the first data template by the scheduler 730 or the processing block 750. In some embodiments, after the first set of projection data is filled into the first data template, the filled first data template may be processed to generate the image data 1 corresponding to the first pixel.

In 1106, a second data template (e.g., 1220 illustrated in FIG. 12) relating to a second pixel may be determined based on the second geometry calculation. As described elsewhere in the present disclosure, the second pixel is next to the first pixel according to the pixel sequence. The second data template may be determined by the scheduler 730 or the geometry calculation block 720. The second data template may correspond to the projection data needed to generate the image data 2 corresponding to the second pixel. As described in connection with 1008, projection data (i.e., the projection data 2) needed to generate the image data 2 corresponding to the second pixel may be determined based on the second geometry calculation.

In 1108, a second set of projection data may be determined based on the filled first data template and the second data template. The second set of projection data may be part of the projection data (i.e., the projection data 2) needed to generate the image data 2 corresponding to the second pixel. Merely by way of example, the filled first data template and the second data template may overlap with each other. An overlapping region where the second data template overlaps with filled the first data template may be determined. The second set of projection data may correspond to the second data template less the overlapping region. In some embodiments, the overlapping region may be determined utilizing the scoreboard memory 831.

In 1110, the second set of projection data may be pre-fetched from a storage (e.g., the second storage mentioned above). The second set of projection data may be pre-fetched by the scheduler 730 or the storage controller 740. The second set of projection data may be pre-fetched during the processing of the first set of projection data (i.e., before the processing of the projection data 2 corresponding to the second pixel according to the pixel sequence).

In 1112, the second set of projection data may be filled into the second data template. The second set of projection data may be filled into the second data template by the scheduler 730 or the geometry calculation block 720. In some embodiments, after the second set of projection data is filled into the second data template, the filled second data template may be processed to generate the image data 2 corresponding to the second pixel.

In some embodiments, the process 1100 may be an iterative process. For example, after the second set of projection data is filled into the second data template, a next pixel (e.g., the third pixel) may be determined according to the pixel sequence. Further, projection data needed to generate image data (e.g., the image data 3) corresponding to the next pixel (e.g., the third pixel) may be at least partially pre-fetched from second storage. In some embodiments, the process 1100 may be performed iteratively until the image data relating to the plurality of pixels in the pixel sequence is all generated.

It should be noted that the above description of the flowchart in FIG. 11 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, a step for storing the second set of projection data may be added between step 1110 and step 1112.

Figure 12:
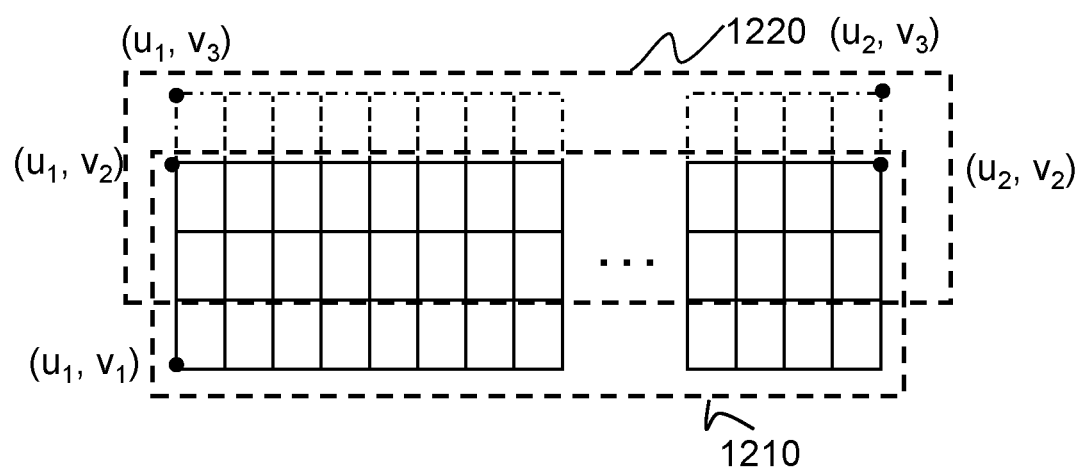
FIG. 12 is a schematic diagram illustrating an exemplary data template according to some embodiments of the present disclosure.

FIG. 12 is a schematic diagram illustrating an exemplary data template according to some embodiments of the present disclosure.

As illustrated in FIG. 12, the projection data detected by the detector 112 may be expressed by a coordinate system associated with the detector 112. For example, assuming that the detector 112 may include a plurality detector units. The plurality of detector units may be arranged in one or more rows, and each row may include one or more detector units. Each detector unit of the plurality of detector units may be expressed by a coordinate value (u, v) according to its position in the coordinate system. Merely by way of example, the plurality of detector units may be arranged in 16 rows, and each row may include 1024 detector units, where u is through 1 to 1024 and v is through 1 to 16. The projection data detected by a specific detector unit may be expressed by the same coordinate value with the detector unit. Thus, the projection data may be expressed as (u, v).

As illustrated in FIG. 12, the projection data $(u_1, v_1)$ through projection data $(u_2, v_2)$ may be needed to generate the image data 1 corresponding to the first pixel. The projection data $(u_1, v_2)$ through $(u_2, v_3)$ may be needed to generate the image data 2 corresponding to the second pixel. The first data template 1210 may be filled with the projection data $(u_1, v_1)$ through projection data $(u_2, v_2)$. As illustrated, the second data template 1220 overlaps with the first data template 1210. The second data template 1220 has been partially filled with the projection data in the overlapping region of the first data template 1210 and the second data template 1220. The second set of projection data to be pre-fetched may correspond to the projection data $(u_1, v_3)$ through $(u_2, v_3)$, which is the second data template 1220 less the overlapping region.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:
1. A method comprising:
   determining a sequence of a plurality of pixels including a first pixel and a second pixel, wherein the second pixel is a next pixel to the first pixel according to the sequence of the plurality of pixels;
   determining a set of projection data corresponding to each of the plurality of pixels in a first storage device by determining a first geometry calculation associated with the plurality of pixels;
   determining a second geometry calculation based on the first geometry calculation;
   determining, based on the second geometry calculation, a first data template associated with the first pixel and a second data template associated with the second pixel; and
   pre-fetching, by the first storage device, from a second storage device, a set of projection data associated with the second pixel based on the first data template and the second data template, wherein the second data template at least partially overlaps a filled first data template in an overlapping region, and the overlapping region of the second data template is filled before the pre-fetching.

2. The method of claim 1, wherein the second geometry calculation is the same as the first geometry calculation.

3. The method of claim 1, further comprising:
   accessing a set of projection data associated with the first pixel from the first storage device based on the first geometry calculation.

4. The method of claim 3, wherein the pre-fetching, by the first storage device, from the second storage device, the set of projection data associated with the second pixel based on the first data template and the second data template comprises:
   filling the set of projection data associated with the first pixel into the first data template;
   determining the overlapping region where the second data template overlaps the filled first data template; and
   pre-fetching, from the second storage device, the set of projection data associated with the second pixel based on the second data template less the overlapping region.

5. The method of claim 3, further comprising:
   accessing the set of projection data associated with the second pixel from the first storage based on the first geometry calculation.

6. The method of claim 5, further comprising:
   generating an image based at least in part on the set of projection data associated with the first pixel and the set of projection data associated with the second pixel.

7. The method of claim 6, wherein the generating the image based at least in part on the set of projection data associated with the first pixel and the set of projection data associated with the second pixel comprises:
   generating the image by processing the set of projection data associated with the first pixel and the set of projection data associated with the second pixel at least partially in parallel.

8. The method of claim 1, wherein the first storage device includes a cache and the second storage device includes a mass storage.

9. A system, comprising:
   at least one storage medium including a set of instructions; and
   at least one processor in communication with the at least one storage medium, wherein when executing the set of instructions, the at least one processor is directed to cause the system to perform operations including:
- determining a set of projection data corresponding to each of the plurality of pixels in a first storage device by determining a first geometry calculation associated with the plurality of pixels;
- determining a second geometry calculation based on the first geometry calculation;
- determining, based on the second geometry calculation, a first data template associated with the first pixel and a second data template associated with the second pixel; and
- pre-fetching, by the first storage device, from a second storage device, a set of projection data associated with the second pixel based on the first data template and the second data template wherein the second data template at least partially overlaps a filled first data template in an overlapping region, and the overlapping region of the second data template is filled before the pre-fetching.

10. The system of claim 9, wherein the second geometry calculation is the same as the first geometry calculation.

11. The system of claim 9, wherein the at least one processor is further directed to cause the system to perform the operations comprising:
- accessing a set of projection data associated with the first pixel from the first storage device based on the first geometry calculation.

12. The system of claim 11, wherein the pre-fetching, by the first storage device, from the second storage device, the set of projection data associated with the second pixel based on the first data template and the second data template comprises:
- filling the set of projection data associated with the first pixel into the first data template;
- determining the overlapping region where the second data template overlaps the filled first data template; and
- pre-fetching, from the second storage device, the set of projection data associated with the second pixel based on the second data template less the overlapping region.

13. The system of claim 11, wherein the at least one processor is further directed to cause the system to perform the operations comprising:
- accessing the set of projection data associated with the second pixel from the first storage based on the first geometry calculation.

14. The system of claim 13, wherein the at least one processor is further directed to cause the system to perform the operations comprising:
- generating an image based at least in part on the set of projection data associated with the first pixel and the set of projection data associated with the second pixel.

15. The system of claim 14, wherein the generating the image based at least in part on the set of projection data associated with the first pixel and the set of projection data associated with the second pixel comprises:
- generating the image by processing the set of projection data associated with the first pixel and the set of projection data associated with the second pixel at least partially in parallel.

16. The system of claim 9, wherein the first storage device includes a cache and the second storage device includes a mass storage.

17. A non-transitory computer readable medium, comprising executable instructions that, when executed by at least one processor, direct the at least one processor to perform a method, the method comprising:
- determining a set of projection data corresponding to each of the plurality of pixels in a first storage device by determining a first geometry calculation associated with the plurality of pixels;
- determining a second geometry calculation based on the first geometry calculation;
- determining, based on the second geometry calculation, a first data template associated with the first pixel and a second data template associated with the second pixel; and
- pre-fetching, by the first storage device, from a second storage device, a set of projection data associated with the second pixel based on the first data template and the second data template, wherein the second data template at least partially overlaps a filled first data template in an overlapping region, and the overlapping region of the second data template is filled before the pre-fetching.

18. The non-transitory computer readable medium of claim 17, wherein the pre-fetching, by the first storage device, from the second storage device, the set of projection data associated with the second pixel based on the first data template and the second data template comprises:
- filling a set of projection data associated with the first pixel into the first data template;
- determining the overlapping region where the second data template overlaps the filled first data template; and
- pre-fetching, from the second storage device, the set of projection data associated with the second pixel based on the second data template less the overlapping region.

* * * * *